United States Patent [19]

O'Brien

[11] Patent Number: 5,121,479
[45] Date of Patent: Jun. 9, 1992

[54] EARLY START MODE DATA TRANSFER APPARATUS

[75] Inventor: John T. O'Brien, Lafayette, Colo.

[73] Assignee: Storage Technology Corporation, Louisville, Colo.

[21] Appl. No.: 552,917

[22] Filed: Jul. 19, 1990

Related U.S. Application Data

[63] Continuation of Ser. No. 148,663, Jan. 27, 1988.

[51] Int. Cl.[5] .............................................. G06F 13/28
[52] U.S. Cl. ................................ 395/250; 364/239.51; 364/939.81
[58] Field of Search ................................ 364/200, 900

[56] References Cited

U.S. PATENT DOCUMENTS

| | | | |
|---|---|---|---|
| 3,836,891 | 9/1974 | McDaniel | 364/900 |
| 4,038,642 | 7/1977 | Bouknecht et al. | 364/200 |
| 4,125,870 | 11/1978 | Suzuki et al. | 364/900 |
| 4,258,418 | 5/1981 | Heath | 364/200 |
| 4,309,755 | 1/1982 | Lanty | 364/200 |
| 4,423,482 | 12/1983 | Hargrove et al. | 364/200 |
| 4,458,316 | 7/1984 | Fry et al. | 364/200 |
| 4,542,457 | 9/1985 | Mortensen et al. | 364/200 |
| 4,602,331 | 7/1986 | Sheth | 364/200 |
| 4,642,797 | 2/1987 | Hoberman et al. | 365/221 |
| 4,675,807 | 6/1987 | Gourneau et al. | 364/200 |
| 4,716,525 | 12/1987 | Gilamyi et al. | 364/200 |
| 4,750,107 | 6/1988 | Buggert | 364/200 |
| 4,788,638 | 11/1988 | Ogawa et al. | 364/200 |
| 4,792,898 | 12/1988 | McCarthy | 364/200 |
| 4,803,654 | 2/1989 | Rasberry et al. | 364/200 |
| 4,805,094 | 2/1989 | Oye et al. | 364/200 |
| 4,843,544 | 6/1989 | DuLac et al. | 364/200 |
| 4,860,193 | 8/1989 | Bentley et al. | 364/200 |
| 4,884,190 | 11/1989 | Ngai et al. | 364/200 |
| 4,922,438 | 3/1990 | Ballweg | 370/85.15 |

*Primary Examiner*—Michael R. Fleming
*Assistant Examiner*—Christopher B. Shin
*Attorney, Agent, or Firm*—Dorr, Carson, Sloan & Peterson

[57] ABSTRACT

The early start mode data transfer apparatus coordinates the reading and writing of data files into and out of the data buffer of the tape control unit so that a data file can be written into the data buffer while another data file is concurrently being read out of the data buffer. Thus, both the host computer and the associated tape drive units can be active at the same time reading or writing data files into the data buffer of the tape control unit. The early start mode data transfer apparatus closely coordinates the reading and writing activity of the host computers and the associated tape drive units to avoid the overwriting data files in the data buffer as well as emptying the data buffer before the complete data file is written therein. By enabling the concurrent activity of the host computers and the associated tape drive units, the early start mode data transfer apparatus improves the efficiency of the data transfers between the host computers of the data transfers between the host computers and the associated tape drive units by increasing the occupany on the associated tape drive units. Thus, the associated tape drive units can provide a greater throughput since less time is spent in a wait mode while a data file is being written into or read out of the data buffer in the tape control unit. These and other advantages of this apparatus are explained.

9 Claims, 6 Drawing Sheets

EARLY START MODE DATA TRANSFER APPARATUS

This is a continuation of application Ser. No. 07/148,663, filed Jan. 27, 1988.

FIELD OF THE INVENTION

This invention relates to multi processor systems and, in particular, to hardware and software in a tape control unit that functions to perform data file transfers in a timewise efficient fashion.

PROBLEM

It is a problem in tape control units to transfer data files between the host computer and the associated tape drive units in a timewise efficient manner. A tape control unit is interposed between one or more host computers and one or more tape drive units to control the transfer of data files therebetween. The one or more host computers are connected by a channel data link to the tape control unit and one or more tape drive units are connected by a device data link to the tape control unit. The tape control unit includes a data buffer which stores data files being transferred between a host computer and an associated tape drive unit. It is a problem in transferring these data files between the host computer and the associated tape drive unit to achieve a high throughput in a timewise efficient manner since the tape control unit receives the entire data file transferred from the transmitting one of the host computer or the associated tape drive unit and stores this data file for subsequent transmission to the receiving one of the host computer or the associated tape drive unit. Thus, there is a time delay in the transmission of the data file due to the fact that the tape control unit stores the entire data file and retransmits the data file after it has been received in its entirety. Due to this architecture of the tape control unit, the receiving device (the host computer or the associated tape drive unit) remains in an idle state While the transmitting device (the host computer or the associated tape drive unit) is transmitting the entire data file to the data buffer in the tape control unit. Therefore, a significant amount of time is expended by the host computers and the tape drive units in a wait mode waiting for the tape control unit to indicate that the data buffer is available to receive or transmit a data file. In addition, while the host computers can be interrupted during a data file transfer, the tape drive units cannot, since the tape must be stopped and repositioned if an interruption of the data file transfer occurs.

SOLUTION

The above described problems are solved and a technical advance achieved in the field by the early start mode data transfer apparatus. The early start mode data transfer apparatus coordinates the reading and writing of data files into and out of the data buffer of the tape control unit so that a data file can be written into the data buffer While another data file is concurrently being read out of the data buffer. Thus, both the host computer and the associated tape drive units can be active at the same time reading or writing data files into the data buffer of the tape control unit. The early start mode data transfer apparatus closely coordinates the reading and writing activity of the host computers and the associated tape drive units to avoid the overwriting data files in the data buffer as well as emptying the data buffer before the complete data file is Written therein. By enabling the concurrent activity of the host computers and the associated tape drive units, the early start mode data transfer apparatus improves the efficiency of the data transfers between the host computers and the associated tape drive units by decreasing the response time of the associated tape drive units. Thus, the associated tape drive units can provide a greater throughput since less time is spent in a Wait mode while a data file is being written into or read out of the data buffer in the tape control unit. These and other advantages of this apparatus will be explained in further detail in the following detailed description.

DETAILED DESCRIPTION OF THE DRAWING

Figure 1:
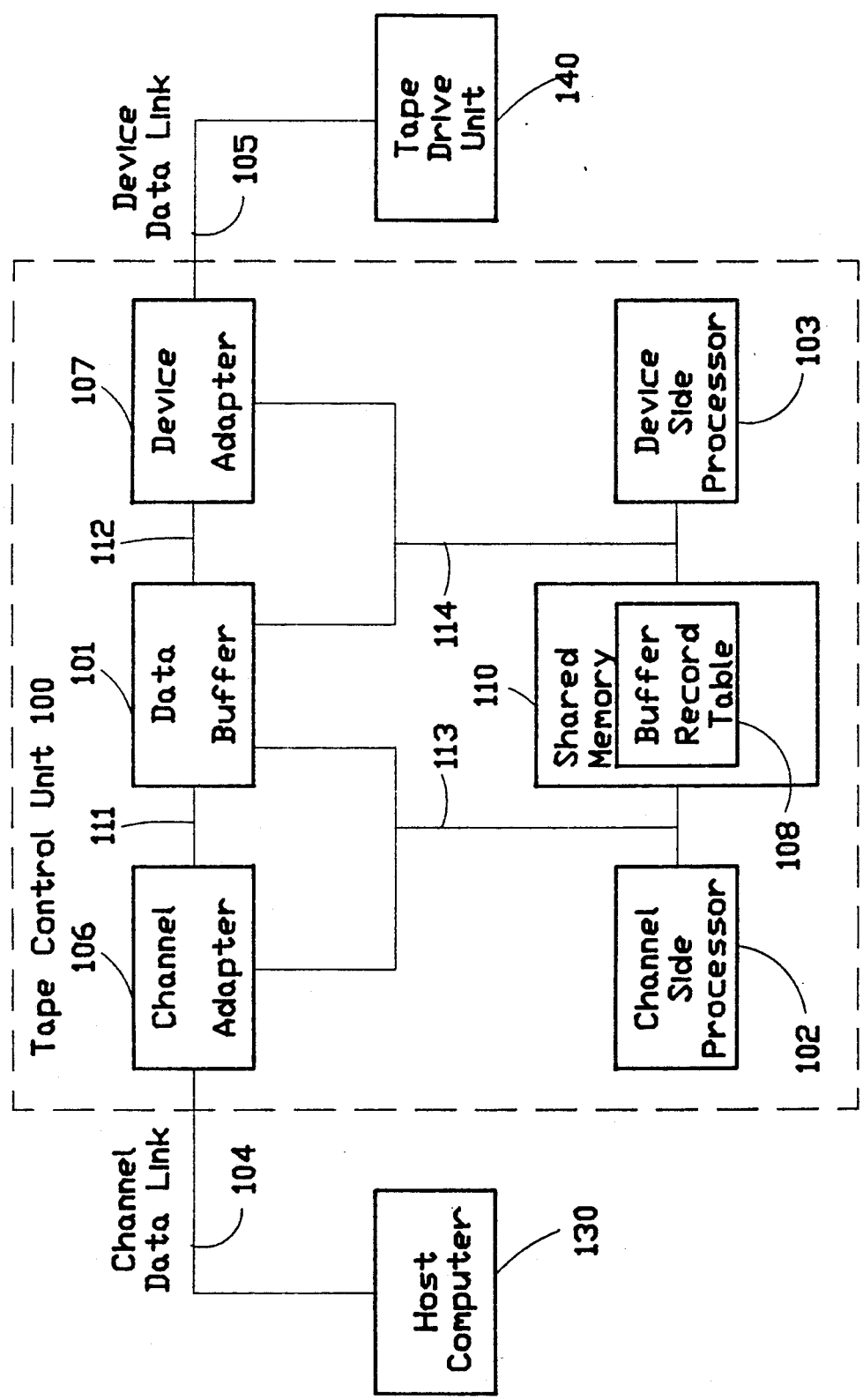
FIG. 1 illustrates the early start mode data transfer apparatus in block diagram form.

In multiprocessor systems, that include a plurality of processors operating cooperatively to perform a single task, the coordination of the processors' operation is a critical function. The single task is divided into a plurality of segments, each of which is assigned to one of the processors for execution. The processor coordination is accomplished by loosely coupling the processors via a shared memory and its associated hardware.

A particular implementation of this processor coordination is disclosed in the form of early start mode data transfer apparatus that is part of a tape control unit 100 for transferring data files between a host computer and an associated tape drive unit. The data files are transmitted to the tape control unit 100 for storage in the data buffer 101 portion of the tape control unit 100. The stored data files are subsequently retransmitted to a designated destination. A data record is taken to be the minimum unit of data which is maintained within the data buffer until the entire unit of data has been successfully retransmitted to a designated destination. This unit of data is maintained within the data buffer until the entire transmission is complete so that if an error is encountered during the transmission of the data, the data may be retransmitted. The early start mode data transfer apparatus enables the concurrent, interleaved operations of data file storage into the data buffer and data file retransmission out of the data buffer.

The early start mode data transfer apparatus consists of a combination of hardware and software elements that are part of the tape control unit 100. The tape control unit 100 is interposed between one or more host computers 130 and one or more tape drive units 140. Host computer 130 is connected to tape control unit 100 by a channel data link 104 that transports data and control signals therebetween. Tape drive unit 140 is also connected to tape control unit 100 via device data link 105 that functions to transport control and data signals therebetween. Both channel adapter 106 and device adapter 107 are connected via conductors 111 and 112 respectively to data buffer 101 which stores the data files that are being transported between host computer 130 and tape drive unit 140. Channel adapter 106 and device adapter 107 serve as interface devices to interconnect data buffer 101 with channel data link 104 and device data link 105 respectively. The operation of channel adapter 106 is coordinated by channel side processor 102 through data link 113 while device adapter 107 is coordinated by device side processor 103 through data link 114. The operation of channel side processor 102 and device side processor 103 is coordinated by the use of a shared memory 110 and the loosely coupling of the channel side processor 102 and device side processor 103 via software as will be described herein below. Shared memory 110 contains a number of records such as buffer record table 108 that provide a method of sharing data between channel side processor 102 and device side processor 103 to thereby coordinate the operation of these two processors.

Shared memory 110 contains a number of storage locations which contain information necessary for the coordination of the action of the processors 102 and 103. These storage locations may be read or written by either processor. Furthermore, the shared memory contains a mechanism which allows one processor to prevent the other processor from modifying the storage locations which contain information associated with a particular device. This mechanism is called the Shared Memory Device Lock. The Shared Memory Device Lock is set to prevent modification of data by the other processor and is reset to allow modification of data by the other processor.

Some of the storage locations in the shared memory contain a table of information regarding the records which are stored in the data buffer 101 on behalf of tape unit 140. If there are multiple tape drive units attached to tape control unit 100, there is a separate table for each tape drive unit. The buffer record table 108 consists of zero, one or more buffer record table entries, with each entry describing one data record stored in data buffer 101.

Each buffer record table entry contains information specifying where the data record is stored in the buffer, the size of the data record, whether the entire data record is contained in the data buffer or only a portion of the data record is contained in the data buffer, error checking information associated with the record and other information not pertinent to this invention.

Buffer record table entries which are not being used to hold information describing a data record in data buffer 101 are contained in a table in the shared memory referred to as the free record table. When a data record is received from a host computer 130 or a tape drive unit 140, a buffer record table entry is removed from the free record table, information describing the data record is placed in the buffer record table entry and the buffer record table entry is added to the buffer record table for the device to which the record will be written or from which the record was read.

Other storage locations used to identify whether a data transfer is in progress over channel data link 104 or device data link 105 and if a data transfer is in progress, to identify which of the tape drive units 140 is the one for which the transfer is being performed. These storage locations are referred to as device engaged in channel transfer and device transferring data. Each location may contain a value which identifies a tape drive unit 140 or a value which indicates that no transfer is in progress.

A further storage location in the shared memory 110 contains a flag referred to as the Need New Barrier Address Time flag. This flag is set by one processor to inform the other processor that it must calculate the time at which a data record will be removed from data buffer 101 and present the results of this calculation to the first processor.

The data buffer 101 consists of a memory array and two sets of data transfer control circuitry, one for performing data transfers over data link 111 and the other for performing data transfers over data link 112. The control circuitry for performing data transfers over data link 111 is coordinated by the channel side through data link 113 and the control circuitry for performing data transfers over data link 112 is coordinated by the device side processor through data link 114.

Within each set of data transfer control circuits in the data buffer 101 are several registers. The pointer register contains the address in the memory array at which the next unit of data will be read or written. When a data record stored in the memory array is about to be transferred over data link 111 to the host computer 130 or over data link 112 to the tape drive unit 140, the pointer register is loaded with the address of the location in the memory array at which the first unit of data of the data record is stored. As successive units of data are transferred from the memory array, the value in the pointer register is updated to contain the address of the next unit of data which had previously been written into the memory array.

The byte count register is used to determine how many bytes of data will be transferred over data link 111 or data link 112 before the channel adapter 106 or device adapter 107 are signaled that the transfer of the data record has been completed. In other implementations, the function of identifying the amount of data contained in a particular data record may be performed by a stop address register rather than a byte count register.

When a data record is about to be transferred from the host computer 130 over data link 111 or from the tape drive unit 140 over data link 112, the pointer register is loaded with the address of the location in the memory array which is just beyond the last memory location which contains or contained a unit of data from the previous data record. The first unit of data of the record about to be transferred will then be placed in the memory location beyond the locations used for storing the previous record. Thus, the data of the previous record will not be overwritten and destroyed. As successive units of data are written into the memory array by the data transfer control circuitry, the value in the pointer register is updated so that it contains the address of the next location in the memory array at which data will be put.

Another register, the barrier address register is loaded with the address of the start of the first data record which is beyond the address which was loaded into the pointer register. The data transfer control logic prevents the writing of data beyond the address contained in the barrier address register so that the data record(s) previously stored in the memory array will not be overwritten and destroyed.

The new barrier address register is loaded with the address of the record which is beyond the record which is protected by the address in the barrier address register. A control signal from the other set of data transfer control circuitry causes the value stored in the new barrier address register to be transferred into the barrier address register. This control signal is activated by the processor attached to the other set of data transfer control logic when that processor determines that the data record protected by the address in the barrier address register no longer needs to be stored in the data buffer and the portion of the memory array which contained the data record may be overwritten.

The mode select register in the data transfer control circuitry controls whether a data transfer operation is to be performed, in which direction the data will be transferred and what conditions will be tested to cause the data transfer to stop.

The operation of this early start mode data transfer apparatus can better be understood by description of the operation of several early start data transfers.

Write With Early Channel Start

The write with early channel start data transfer mode allows host computer 130 to transmit a data file over channel data link 104 to data buffer 101 prior to there being enough room in data buffer 101 for the entire data file to fit therein. This early start data transfer occurs when tape drive unit 140 is already selected and being written to over device data link 105, in that a data file is being transferred from data buffer 101 to tape drive unit 140. Thus, in a normal operation, the data file in host computer 130 will not be transferred to data buffer 101 until there is sufficient space in data buffer 101 to store the entire data file. However, since a data file is being written from data buffer 101 to tape drive unit 140, the contents of data buffer 101 are being reduced so that upon the completion of this data file transfer to tape drive unit 140 sufficient space will exist in data buffer 101 to store the data file that is being transmitted by host computer 130 over channel data link 104 to data buffer 101.

In order to operate in the most timewise efficient manner, the early start mode data transfer apparatus 120 begins the data file transfer from host computer 130 to data buffer 101 over channel data link 104 while data buffer 101 is concurrently writing a previously stored data file to tape drive unit 140 over device data link 105. Thus, by beginning the data file transfer from host computer 130 before there is sufficient space for the entire data record in data buffer 101 the two operations can be overlapped thereby increasing the throughput of tape control unit 100 and increasing the occupancy time of tape drive unit 140 since there will be no delay between the writing of the data file from data buffer 101 to tape drive unit 140 and the writing of the data file from host computer 130 to data buffer 101. This concurrent writing of data files can be initiated When the time that it would take for host computer 130 to transfer the data file over channel data link 104 into data buffer 101 to fill up the remaining free space is greater than the time that data buffer 101 takes to write the previously stored data file into tape drive unit 140 over device data link 105 and plus the time to check this transferred data file. If this is the case, data buffer 101 will not overrun because the device side will have completed the data file transfer thereby freeing up space in data buffer 101 before that space is required by host computer 130 in transferring its data file into data buffer 101.

This data transfer mode takes advantage of the fact that when a record is being transferred to a device, the time at which the write and readback check of the record will be completed can be calculated. Because the end of the readback check time is the time at which it is no longer necessary to maintain the data record that has been readback checked in data buffer 101 and therefore the new barrier address value can be loaded into the barrier address register in data buffer 101. This end of readback check time is then called the new barrier address time. Using the new barrier address time, the channel side processor 102 can then anticipate when sufficient space Will be available in data buffer 101 to store another data file. Channel side processor 102 can then begin a channel data transfer prior to the end of the readback check of the data record being written from data buffer 101 to data drive unit 140.

Determination of Buffer Availability

Figure 2:
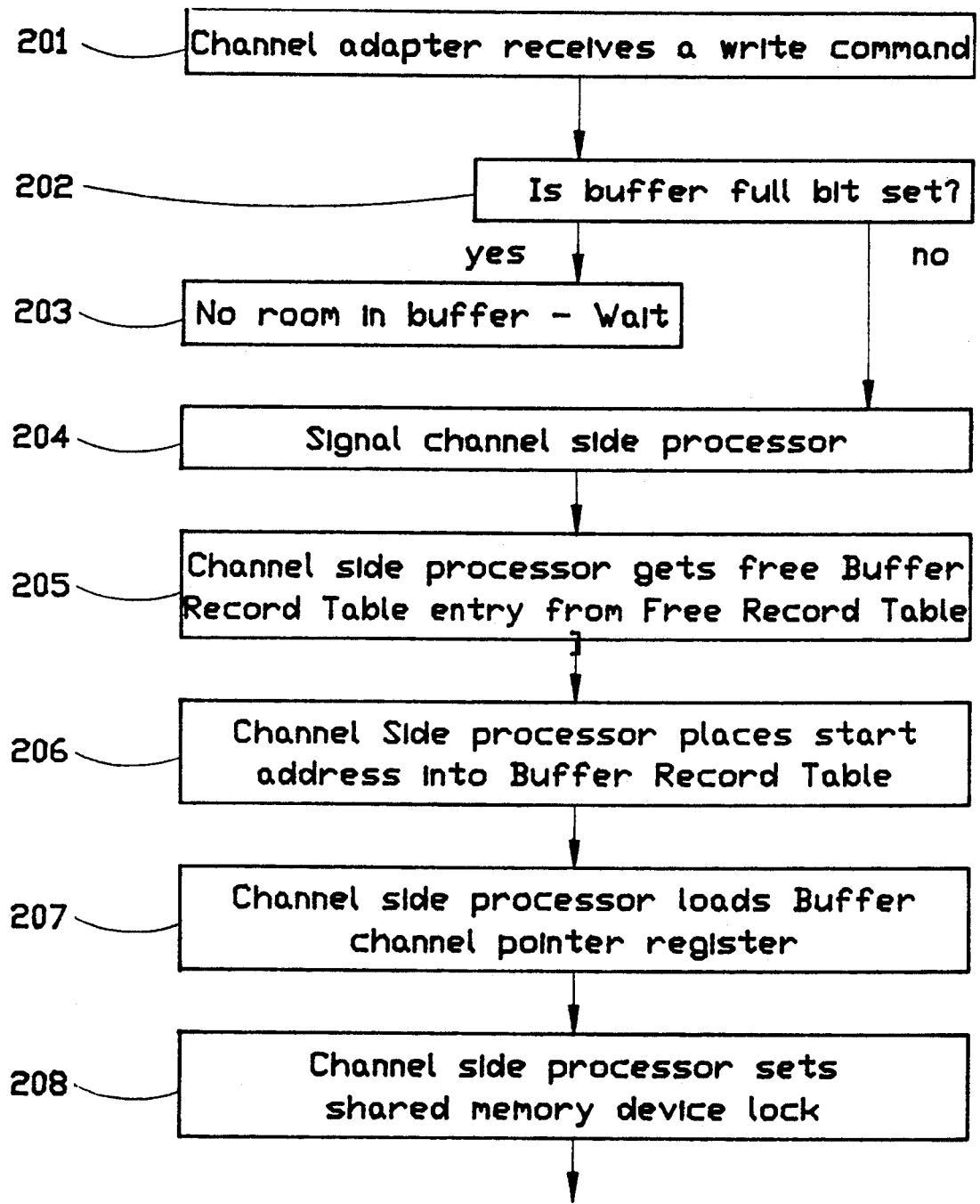
FIGS. 2 through 6 illustrates in flow diagram form the operation of the early start mode data transfer apparatus.
Figure 3:
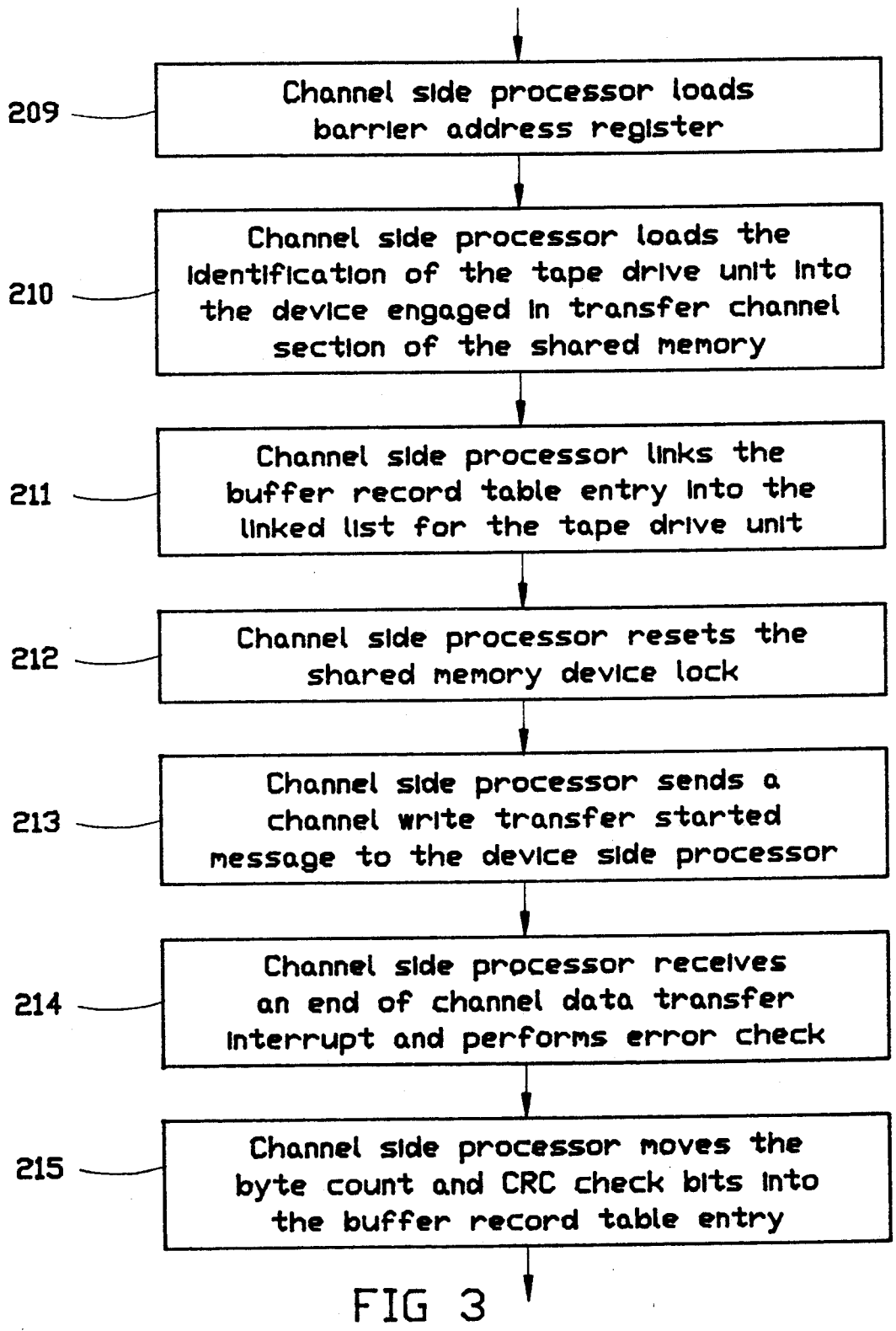
Figure 4:
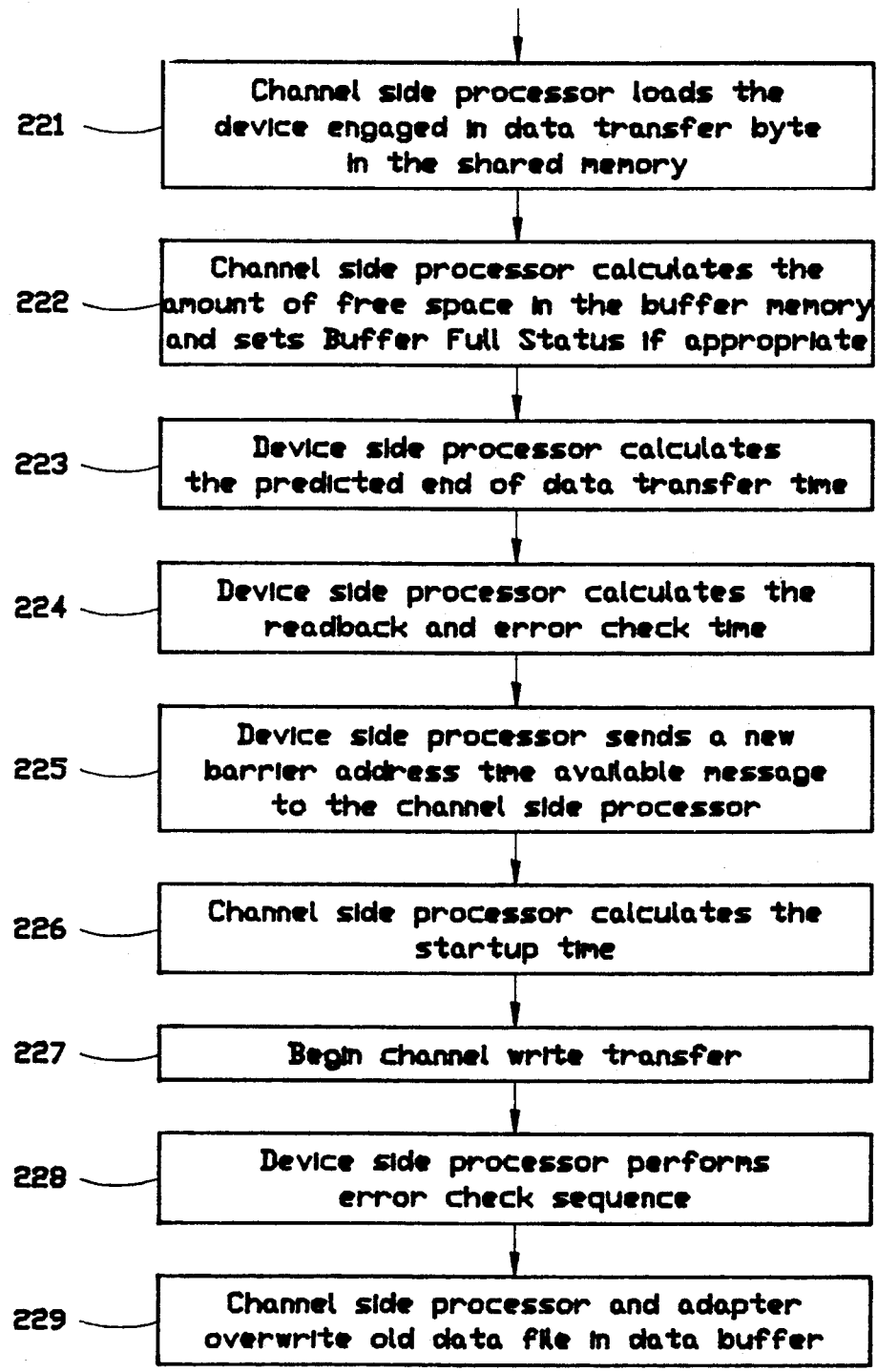
Figure 5:
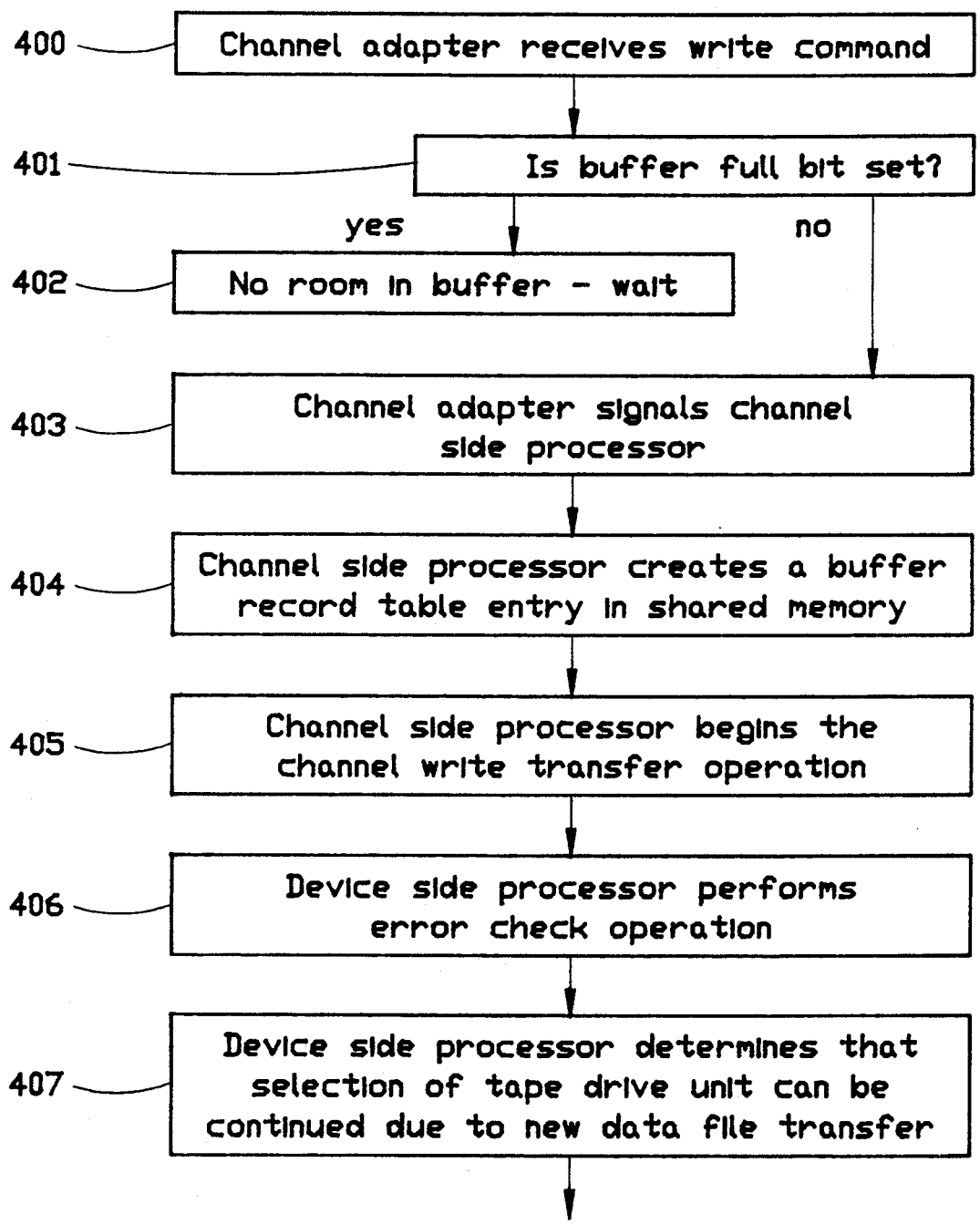
Figure 6:
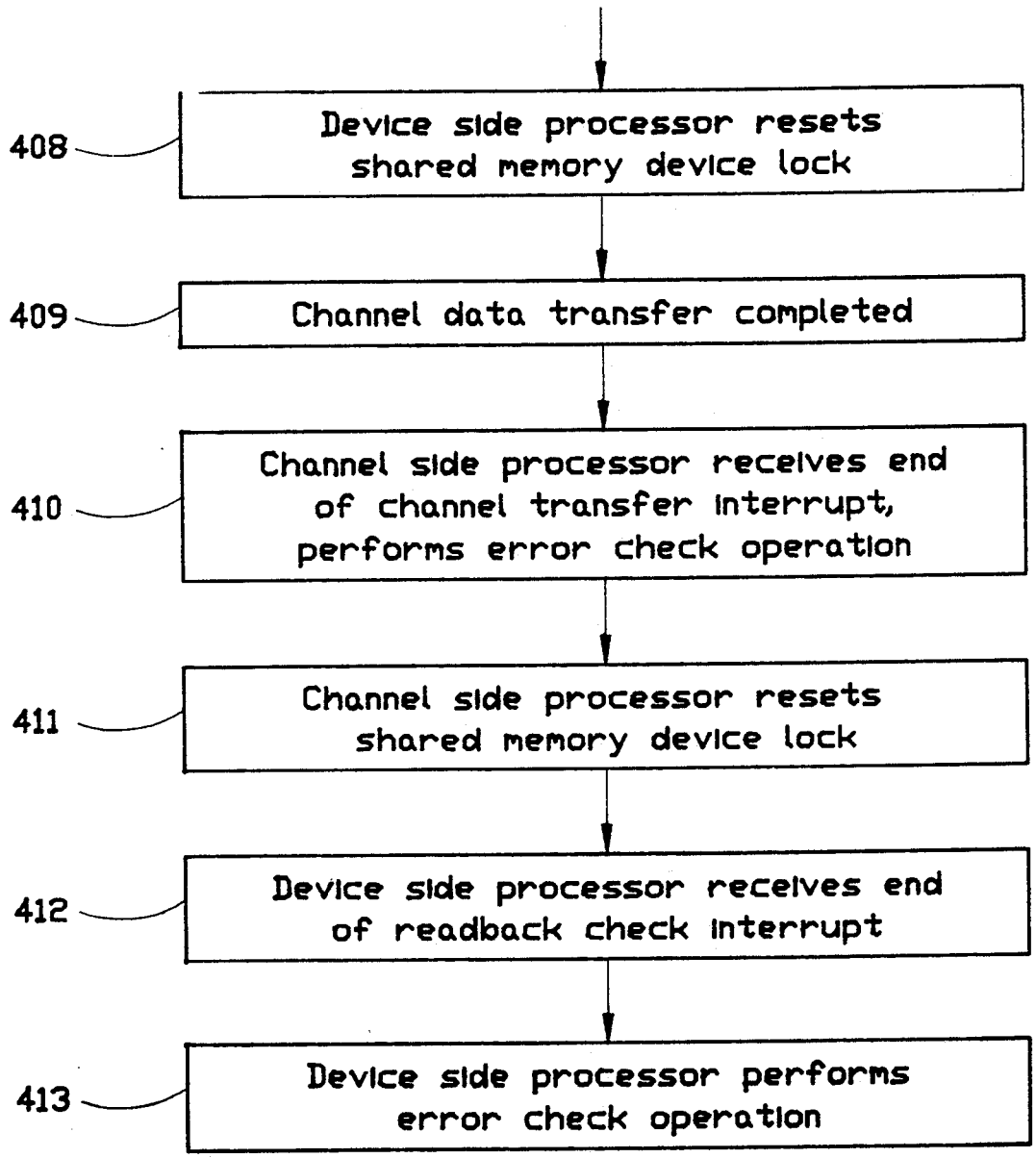

The operation of early start mode data transfer apparatus is provided in flow diagram form in FIGS. 2 through 6. Host computer 130, when it has a data file to transfer to tape drive unit 140 through tape control unit 100, transmits a write command to channel adapter 106 over channel data link 104. Channel adapter 106 and channel side processor 102 operate together to interconnect channel data link 104 to data buffer 101. The division of responsibility between channel adapter 106 and channel side processor 102 in performing this function is a somewhat arbitrary division and this description provides only one of many such selections. Channel adapter 106 receives the write command from host computer 130, at step 201 in FIG. 2, and proceeds to step 202 to determine whether the buffer full bit is set. If buffer full bit is set then the transfer of a data file to data buffer 101 will be premature because there is insufficient space to store the data file therein. If this is the case, processing advances to step 203 where again host computer 103 is signaled to enter a wait state since there is no available space in data buffer 101 to store the data record that is to be transferred. However, if at step 202 channel adapter 106 determines that the buffer segment full bit is not set, then at step 204 channel adapter 106 signals channel side processor 102 that the host computer 130 is ready to write a data file into data buffer 101.

Coordination of Data File Transfer

At step 205, channel side processor 102 reads shared memory 110 to obtain a buffer record table entry from the free record table portion of shared memory 110. At step 206 channel side processor 102 places the start address into this buffer record table entry. Channel side processor 102 marks the buffer table entry as being incomplete since not all the data necessary has been written therein. At step 207, channel side processor 102 loads the buffer channel pointer register with the next record start address that was stored in the channel side processor 102 local memory. At this point, channel side processor 102 at step 208 sets the shared memory device lock in shared memory 110 to prevent device side processor 103 from modifying the control information to be used by channel side processor 102 in setting up data buffer 101 and to prevent device side processor 103 performing an operation that would overwrite the control information that channel side processor 102 is writing into shared memory 110. At step 209, channel side processor determines what values are to be loaded into the barrier address registers in the data buffer hardware. This is accomplished using the following pseudo code described operation:

The channel side processor decides what values to load into the barrier address registers in the data buffer hardware:

If this device has no BRT entries.
    Channel Barrier Address Reg=Next Record

Start Address
    Channel New Barrier Address Reg=Next Record
      Start Address
  Else (there is at least one BRT entry)
    Channel Barrier Address Reg Record Start
      Address of 1st BRT entry
    If there is no second BRT entry
      Channel New Barrier Address Reg=Next Record
        Start Address
    Else (there is a second BRT entry)
      Channel New Barrier Address Reg=Record Start
        Address of 2nd BRT entry
    Endif (only one BRT entry)
  Endif (no BRT entries)

Initially, there are no data records stored in data buffer 101 and no BRT entries in the buffer record table associated with tape drive unit 140, so the channel side processor 102 loads both the channel barrier address register and the channel new barrier address register with the next record start address. At step 215, channel side processor 102 loads the identification of tape drive unit 140 into the device engaged channel transfer entry in shared memory 110. This gives device side processor 103 the responsibility for keeping the barrier address in the channel side data buffer logic up to date if the device side processor 103 removes any records from this device's buffer segment by writing them out of data buffer 101 through device adapter 107 into tape drive unit 140. At step 211, channel side processor 102 takes the buffer record table entry and adds it to the buffer record table 108 associated with tape drive unit 140. Once this record has been written into the buffer record table 108 portion of shared memory 110, channel side processor 102 at step 212 releases the shared memory device lock for shared memory 110 so that shared memory 110 is now available to channel side processor 102 and device side processor 103.

At step 213, channel side processor 102 transmits a channel write transfer started message to device side processor 103. Device side processor 103 accepts the message and performs scheduling activities to transfer this data file to tape drive unit 140 after it has been stored in data buffer 101. At step 214, when the transfer of the data file has been completed from host computer 130 over a channel data link 104 through channel adapter 106 and bus 111 to data buffer 101, channel side processor 102 receives an end of channel data transfer interrupt from channel adapter 106 and performs an error check operation. If there are no errors detected in the data transfer, as step 215 channel side processor 102 moves the byte count and error checking information such as channel data cyclical redundancy check data bits into the buffer record table 108 entry associated with this data file. Channel side processor 102 also sets the shared memory device lock for shared memory 110 and marks the buffer record table entry as being complete. At step 216, channel side processor 102 loads the device engaged in channel transfer byte in shared memory 110 to indicate that no device is presently transferring data with the channel. Once this operation is completed channel side processor 102 resets the shared memory device lock to free shared memory 110 for access by device side processor 103.

Calculate Buffer Availability Time

Channel side processor 102 at step 217 must decide whether or not to set the buffer full status bit. This is accomplished by first comparing the amount of free space in the buffer segment to the length of the record which it expects to receive from the channel. The expected record length can be transmitted by host computer 130 to tape control unit 100 prior to the transmission of the data record. In this description, the expected record length is assumed to be the length of the longest record encountered in this data file on this device.

If the free space is greater than or equal to the expected record length
  Don't set buffer full status
Else
  Set the Shared Memory Device Lock
  If the free space is greater than or equal to the expected record length (test again now that we have the Shared Memory Device Lock)
    Don't set buffer full status
    Reset the Shared Memory Device Lock
  Else (not enough free space for the next record)
    If the device is not presently selected or has not yet started its first data transfer operation since being selected (i.e. there is not a valid New Barrier Address Time value stored in shared memory)
      Set buffer status and set the Need New Barrier Address Time flag in shared memory so that the device side processor will know to signal the channel side processor when the device starts its first data transfer operation following being selected.
      Reset the Shared Memory Device Lock
    Else (the device is presently selected and has started its data transfer)
      If the record length of the record presently being written to the device plus the free space is greater than the length of the record we expect to receive from the channel
      And the device side has not marked the record at the head of the BRT list as being in error
      And the amount of time between now and the time that the device side processor has predicted that it will load the channel new barrier address is less than the time that it will take for a channel transfer to fill up the free space (i.e. free space / channel transfer rate)
      Then
        Don't set buffer full status
        Reset the Shared Memory Device Lock
      Else (can't do early channel start right now)
        Set buffer full status
        If the length of the record presently being written plus the free space is greater than the length of the record that we expect to receive from the channel
          Reset the Shared Memory Device Lock
          Load the channel reconnect timer so that it will signal the channel side processor after (time until device side processor will move the channel side barrier address—(free space / channel rate) ). When this signal occurs, the channel side processor will clear the buffer full status and if the host computer 130 has previously requested the initiation of a write transfer, the host computer 130 is signaled over channel data link 104 that the write transfer may begin.
        Else (not enough space will be freed)
          Set the Need New Barrier Address Time Flag in shared memory.
          Reset the Shared Memory Device Lock When the device side sends the New Barrier Address Time Available message, we will reevaluate the buffer full/empty situation.
Endif
Endif (start channel now)
Endif (not selected or data transfer not started)
Endif (free space > =record length)
Endif (free space > =record length)

The channel side processor sends final status to the channel.

Meanwhile, device side processor 103 responds to the need new barrier address time flag set in shared memory 110 to calculate the predicted end of data transfer time of the previously stored data file in data buffer 101 to tape drive unit 140. This calculation is accomplished by using the data file records in the buffer record table 108 of shared memory 110. At step 219, device side processor 103 calculates the time at which the readback check and error check for this data file will be complete and loads this value into the new barrier address time location in shared memory 110. Device side processor 103 also sets the shared memory device lock and loads the identification of tape drive unit 140 into the device transferring data location shared memory 110. Once this done, at step 220 device side processor 103 resets the shared memory device lock and makes sure that the free space plus the record length of the data file being written from data buffer 101 to tape drive unit 140 is greater than the record length of the data file expected to be received over channel data link 104 from host computer 130. If there is enough room, device side processor 103 transmits a new barrier address time available message to channel side processor 102. At step 221, channel side processor 102 receives the new barrier address available message from device side processor 103 and calculates the time at which sufficient space Will be available in data buffer 101 to begin writing the data file from host computer 130. When this time is reached at step 222, channel side processor 102 enables channel adapter 106 to begin reading the data file from host computer 130 over channel data link 104 even though there is not enough space in the buffer segment of data buffer 101 to receive the entire record.

At step 223, device side processor 103 and device adapter 107 are concurrently transferring a previously written data file from data buffer 101 to tape drive unit 140 over device data link 105. When this file has been written, device side processor 103 performs an error check on the data file transferred to tape drive unit 140. When this error check has been successfully completed, there is no further need to store in data buffer 101 the data record which was just written. The device side processor 103 causes the data buffer 101 to transfer the contents of the channel new barrier address register into the channel barrier address register so that another record can overwrite the data record which was just transferred to tape drive unit 141. At step 224, channel side processor 102 and channel adapter 106 overwrite the data file that was just transferred from data buffer 101 to tape drive unit 140 since this buffer segment space has now been freed by device side processor 103. Once this data file transfer has been completed, channel side processor 102 receives an end of channel data transfer interrupt from channel adapter 106 and performs an error routine. If the data file were successfully transferred to data buffer 101, channel side processor 102 writes the byte count and error checking information such as channel data cyclical redundancy check bits into the buffer record table entry 108 associated with this data file. Channel side processor 102 also marks the buffer record table entry as being complete and error free and updates the amount of free space entry in shared memory 110. The channel side processor 102 also resets the device engaged in channel transfer byte to indicate that no device is performing a channel data transfer on channel data link 104. This completes the concurrent transfer of files.

Write With Early Device Start

The write with early device start data transfer mode permits tape drive unit 140 to begin writing a data file prior to the completion of the transfer of this data file from host computer 130 to data buffer 101. Rather than waiting for this transfer of the data file to be completed from host computer 130 to data buffer 101 so that, among other things, the length of the data file can be determined, device side processor 103 initiates the writing of an incomplete data file. Performing this operation can save a significant amount of time since in many instances waiting for the transfer of the data file to be completed from host computer 130 to data buffer 101 would have forced tape drive unit 140 to be deselected by tape control unit 100. Tape control unit 100 would then, once the transfer of the data file has been completed, have to reselect tape drive unit 140 and go through a repositioning cycle so that the magnetic tape on tape drive unit 140 is properly positioned to write another data record.

The following description assumes that there is a single data record stored in data buffer 101, which record is being written on to tape drive unit 140 at the same time that host computer 130 requests the transfer of a data file from host computer 130 through data buffer 101 to tape drive unit 140. Thus, device adapter 107 is reading out the last record in data buffer 101 to tape drive unit 140 when another data file destined for the same tape drive unit 140 is ready to be written into data buffer 101. Early start mode data transfer apparatus concatenates the two data file write operations and coordinates the concurrent transfer of this new data file from host computer 130 to data buffer 101 along with the writing of the part of this data file that has been written into data buffer 101 to tape drive unit 140 so that the data file flows with minimal delay from host computer 130 through data control unit 100 directly into tape drive unit 140. The interleaving of these operations provides the most timewise efficient fashion of performing the data file write operation.

At step 400, channel adapter 106 receives a write command from host computer 130 over channel data link 104. Channel adapter 106 also determines that the buffer full bit of data buffer 101 is not set at step 401 so that there is sufficient room in data buffer 101 for the receipt of this data file. At step 403, channel adapter 106 signals channel side processor 102 that a write command has been received from host computer 130. At step 404, channel side processor 102 creates a buffer record table entry in shared memory 110 for this data file that is to be transferred from host computer 130. Channel side processor 102 also sets up the data buffer logic and the device engaged in channel transfer byte and, at step 405 begins the channel write transfer operation. In the process described above with respect to the write with early channel start operation takes place here is already selected by tape control unit 100 and active, receiving the data record which preceded the one being transmitted by host computer 130.

Incomplete Write Data File

At step 406, when the device write transfer has been completed, device side processor 103 performs its routine error check sequence to determine whether the data file has been transferred error free from data buffer 101 to tape drive unit 140. This operation has been successfully completed at step 407, device side processor 103 determines that the selection of tape drive unit 140 may be continued since there is a data file to be transferred from host computer 130 to tape drive unit 140. This operation is performed by device side processor 103 setting the shared memory device lock for shared memory 110 in order to read the entries in buffer record table 108. In buffer record table 108, device side processor 103 under the entry for selected tape drive unit 140 finds that there is a buffer record table entry therein but this record table entry is marked as being incomplete. Device side processor 103 recognizes the situation that host computer 130 is writing a data file into data buffer 101 for loading into tape drive unit 140 and this transfer operation has not yet been completed.

Device side processor at step 408 resets the shared memory device lock and activates device adapter 107 to read the data file that is being written by channel adapter 106 from host computer 130 into data buffer 101 into tape drive unit 140. As part of this process, device side processor 103 enters the starting address of this data file into data buffer 101 and activates the write path portion of device adapter 107 for transferring this record. Device side processor 103 also sets the data buffer 101 into stop on last write address mode to distinguish this early start mode data transfer from the normal write operation. At step 409, when the channel data transfer is completed by channel adapter 106, the channel side of data buffer 101 writes the final word of the data file into the buffer memory of data buffer 101. Because the device side portion of the data buffer control logic is operating in stop on last write address mode, the address of this final word of data written into the data buffer is stored so that the device side of the data buffer control logic can determine when the end of the data record has been reached. Channel side processor 102 receives the end of channel transfer interrupt from channel adapter 106 and performs an error check sequence to determine if this data file has been transferred error free. If the data file has been transferred successfully, channel side processor 102 transfers the data file byte count and error checking information such as cyclic redundancy check bytes into the buffer record table entry associated with this data file. Channel side processor 102 then sets the shared memory device lock and marks the buffer record table entry associated with this data file as being complete and error free and updates the amount of free space in buffer segment portion of shared memory 110. The device engaged in channel transfer byte is also reset to indicate that a data transfer is no longer taking place on channel data link 104. At step 411, channel side processor 102 resets the shared memory device lock to release shared memory for access by device side processor 103. Meanwhile, device side processor 103 and device side adapter 107 have been transferring this data file as it is written into data buffer 101 to tape drive unit 140. When device side processor 103 at step 412 receives an indication from device adapter 107 and data buffer 101 that the write transfer and readback check of the data read have been completed, it performs an error check sequence on this data file to determine whether the data file was written on to tape drive unit 140 error free. This check operation is accomplished using the information that was just written into the buffer record table 108 by channel side processor 102 on the completion of the data file transfer from host computer 130. If the data file write operation to tape drive unit 140 has been successfully completed, device side processor 103 indicates a successful completion of this data write operation.

Additional Data Transfers

There are two remaining analogous operations that have not yet been described. These are read with early channel start which is a data transfer mode that permits host computer 130 to read a data file from data buffer 101 prior to the completion of the transfer of this data file from tape drive unit 140 to data buffer 101. The operation of tape control unit 100 and early start mode data transfer apparatus for this operation is analogous to the previously described write with early start operation and therefore will not be described herein. The remaining operation that can be performed by early start mode data transfer apparatus 120 is the read with early device start operation. This is a data transfer mode that allows tape drive unit 140 to start reading a data file into data buffer 101 prior to there being enough room in data buffer 101 to store the entire record read by tape drive 140. This occurs only if there is concurrently a read operation wherein host computer 130 is reading a data file out of data buffer 101 to thereby free up buffer segment space in data buffer 101. This operation is analogous to the previously described with early channel start operation and therefore will not be described herein below.

While a specific embodiment of the invention has been disclosed, variations within the scope of the appended claims are possible, and are contemplated. There is no intention of limitation to what is contained in the abstract or the exact disclosure as herein presented. The above described apparatus is illustrative of the application of the principals of this invention. Normally, other arrangements may be devised by those skilled in the art without departing from the spirit and the scope of this invention.

We claim:

1. In a tape driven control unit that interconnects a host computer with a plurality of tape drives for concurrently transferring a plurality of data files therebetween, apparatus for starting a data file block transfer from said host computer to said tape drive control unit while said tape drive control unit is presently executing a data file block transfer to one of said plurality of tape drives wherein a first data transfer rate between said host computer and said tape drive control unit is greater than a second data transfer rate between said tape drive control unit and said one of said plurality of tape drives, comprising:

means for storing a plurality of data files which are in transit between said host computer and said plurality of tape drives;

means, responsive to said host computer requesting a transfer of a selected data file from said one host computer to one of said plurality of tape drives, for determining whether a data file, previously stored in said storing means, is presently being transferred from said storing means to one of said plurality of tape drives;

means, responsive to said requested data file transfer, for determining a present amount of unused storage capacity in said storing means;

means for comparing said present amount of unused storage capacity with a size of said selected data file in order to determine whether said present amount of unused storage capacity is sufficient to store said selected data file;

means, responsive to said present amount of unused storage capacity being insufficient to store said selected data file, for calculating a first point in time, said first point in time being a function of said size of said selected data file, said present amount of unused storage capacity, and a different between said first data transfer rate and second data transfer rate, wherein said present amount of unused storage capacity is increased to a subsequent amount of unused storage capacity as a result of said presently used storage capacity being vacated by said presently transferring previously stored data file, said subsequent amount of unused storage capacity being sufficient to store said selected data file by a second point in time; and means, responsive to said calculating means, for transmitting, at said first point in time, a control signal to said host computer requesting said host computer to start said transfer of said selected data file into an area containing said present amount of unused storage capacity in said storing means, said transfer of selected data file being concurrent with said data file presently being transferred from said storing means to said one of said plurality of tape drives, said first point in time being prior to said tape drive control unit completing the transfer of said presently transferring previously stored data file to said one of said plurality of tape drives.

2. The apparatus of claim 1 further including:
means, responsive to said calculating means, for initiating said requested data file transfer independent of said presently executing data file transfer.

3. The apparatus of claim 1 further including:
means, responsive to said unused storage capacity determining means indicating that only the presently transferring data file is stored in said storing means, for initiating said requested data file transfer.

4. The apparatus of claim 3 further including:
means, responsive to completion of said presently executing data file transfer and said host computer having transferred only a portion of said selected data file into said storing means, for initiating a transfer, out of said storing means to said one of said plurality of tape drives, said portion of said selected data file presently stored in said storing means, as a remainder of said selected data file is being input by said host computer into said storing means.

5. In a tape drive control unit that interconnects a host computer with a plurality of tape drives for concurrently transferring a plurality of data files therebetween, apparatus for starting a data file block transfer from said host computer to said tape drive control unit while said tape drive control unit is presently executing a data file block transfer to one of said plurality of tape drives wherein a first data transfer rate between said host computer and said tape drive control unit is greater than a second data transfer rate between said tape drive control unit and said one of said plurality of tape drives, comprising:

means for storing a plurality of data files which are in transit between said host computer and said plurality of tape drives;

means, responsive to said host computer requesting a transfer of a selected data file from said host computer to one of said plurality of tape drives, for determining whether a data file, previously stored in said storing means, is presently being transferred from said storing means to one of said plurality of tape drives;

means, responsive to said requested data file transfer, for determining a present amount of unused storage capacity in said storing means;

means for comparing said present amount of unused storage capacity with a size of said selected data file in order to determine whether said present amount of unused storage capacity is sufficient to store said selected data file;

means, responsive to said present amount of unused storage capacity being insufficient to store said selected data file, for calculating a first point in time, said first point in time being a function of said size of said selected data file, said present amount of unused storage capacity, and a difference between said first data transfer rate and second data transfer rate, wherein said present amount of unused storage capacity as a result of said presently used storage capacity being vacated by said presently transferring previously stored data file, said subsequent amount of unused storage capacity being sufficient to store said selected data file by a second point in time;

means, responsive to said calculating means, for transmitting, at said first point in time, a control signal to said host computer requesting said host computer to start said transfer of said selected data file into an area containing said present amount of unused storage capacity in said storing means, said transfer of said selected data file being concurrent with said data file presently being transferred from said storing means to said one of said plurality of tape drives, said first point in time being prior to said tape drive control unit completing the transfer of said presently transferring previously stored data file to said one of said plurality of tape drives; and means for initiating said selected data file transfer independent of said presently executing data file transfer.

6. In a tape drive control unit that includes a memory and that interconnects a host computer with a plurality of tape drives for concurrently transferring a plurality of data files therebetween, a method for starting a data file block transfer from said host computer to said tape drive control unit while said tape drive control unit is presently executing a data file block transfer to one of said plurality of tape drives wherein a first data transfer rate between said host computer and said tape drive control unit is greater than a second data transfer rate between said tape drive control unit and said one of said plurality of tape drives, comprising the steps of:

storing, in said memory, a plurality of data files which are in transit between said host computer and said plurality of tape drives;

determining, in response to said host computer requesting a transfer of a selected data file from said host computer to one of said plurality of tape drives, whether a data file, previously stored in said memory, is presently being transferred from said storing means to one of said plurality of tape drives;

determining, in response to said requested data file transfer, a present amount of unused storage capacity in said tape drive control unit;

comparing said present amount of unused storage capacity with a size of said selected data file in order to determine whether said present amount of unused storage capacity is sufficient to store said selected data file;

calculating, in response to said present amount of unused storage capacity being insufficient to store said selected data file, a first point in time, said first point in time being a function of said size of said selected data file, said present amount of unused storage capacity, and a difference between said first data transfer rate and second data transfer rate, wherein said present amount of unused storage capacity is increased to a subsequent amount of unused storage capacity as a result of said presently used storage capacity being vacated by said presently transferring previously stored data file, said subsequent amount of unused storage capacity being sufficient to store said selected data file by a second point in time; and transmitting, at said first point in time, a control signal to said host computer requesting said host computer to start said transfer of said selected data file into an area containing said present amount of unused storage capacity in said memory, said transfer of said selected data file being concurrent with said data file presently being transferred from said memory to said one of said plurality of tape drives, said first point in time being prior to said tape drive control unit completing the transfer of said presently transferring previously stored data file to said one of said plurality of tape drives.

7. The method of claim 6 further including the step of:

initiating said selected data file transfer independent of said presently executing data file transfer.

8. The method of claim 7 further including the step of:

initiating said selected data file transfer when only the presently transferring data file is stored in said tape drive control unit memory.

9. The method of claim 8, wherein said at least one host computer has transferred only a portion of said selected data file into said tape drive control unit memory, further including the step of:

initiating, in response to said calculating means, a transfer out of said memory to said one of said plurality of tape drives of said portion of said selected data file, presently stored in said memory, as a remainder of said selected data file is being input by said host computer into said tape drive control unit memory upon the completion of said presently executing data file transfer.

* * * * *